United States Patent Office 3,305,445
Patented Feb. 21, 1967

3,305,445
TREATMENT OF INFLAMMATORY CONDITIONS OF NON-MICROBIAL ORIGIN WITH FUSAFUNGINE
Jacques Servier, Neuilly-sur-Seine, Seine, France, assignor to Biofarma, Seine, France, a societe anonyme organized under French laws
No Drawing. Filed Jan. 15, 1962, Ser. No. 166,417
1 Claim. (Cl. 167—58)

This invention relates to pharmaceutical compositions of matter having anti-inflammatory properties and characterized in that they include fusafungine as an essential ingredient therein.

Fusafungine is an antibiotic compound of fungic origin derivable from the culture medium of *Fusarium lateritium* Wr (Strain 437). This compound can be defined by its crude formula $C_{29}H_{51}O_8N_2$, its calculated molecular weight 555 and its melting range 125–129° C. The pure solid crystallizes, is insoluble in water, soluble in glycols and fats. It is stable at elevated temperatures and keeps well when dry in an oily solution. It can be sterilized without affecting its characteristics. Hydrochloric hydrolysis decomposes the compound into two aminoacids:

N-methylvaline and
N-methyl-leucine or N-methyl-isoleucine.

Fusafungine is known to possess antibiotic characteristics substantially coextensive in range to those of penicillin. The discovery, according to the present invention, of anti-inflammatory properties of fusafungine will greatly enhance the therapeutic value of this compound.

The discovery of the anti-inflammatory activity of fusafungine according to the invention is important in that there are many and frequent disorders due to causes other than microorganisms and involving inflammatory processes with the usual symptoms of swelling, heating and pain but without bacterial infection. The invention for the first time teaches the effectiveness of fusafungine therapy in such cases. Moreover, the teachings of the invention show the considerable and unexpected advantages of fusafungine as a specific drug for use in disorders of combined inflammatory and infectious character.

Pharmacology

The toxicity of fusafungine is low. The LD 50 value for the mouse, tested by Beauvillain's procedure, is 350 mg./kg. orally. Chronic toxicity tests on the rat, have shown the drug to be well tolerated without any substantial modification in the weight curve and in the behaviour of the test animals with respect to the controls.

Histological observation of organs of test animals slaughtered after one month's experimentation has shown no pathological alteration, and especially the liver and kidney had a normal appearance.

According to the invention, the anti-inflammatory properties of fusafungine have been studied in vivo by observing the effects of administering the drug to rats in which plantar oedema had been induced by formol injection. Oedema is induced by subcutaneous injection into the rat's paw of 0.1 cm.³ 4% formaline. The volume of the paw of each treated rat in a batch is measured plethysmographically by Buttle et al.'s method, every quarter-hour for one and one half hours. Successive volume increases are compared with the increases observed in control animals tested simultaneously.

Fusafungine, when injected in an olive oil solution intraperitoneally (I.P.) at doses from 50 mg./kg. was found to inhibit oedema induced by subaponevrotic injection of formol.

When orally administered at doses from 100 mg./kg., fusafungine was also found to inhibit formol-induced oedema.

The anti-inflammatory activity of fusafungine is found to be considerably greater than that of acetylsalicylic acid as will be seen from the following table.

In this table, the column titled "inhibition percent" indicates the ratio of the difference between paw volume of treated and untreated rats over the paw volume of untreated rats, the coefficient $\sigma$ indicates the standard deviation from average, the column titled "$t$" gives the results of student's test, the column titled "$p$" gives the probabilities of error.

Fusafungine-base drugs according to the invention may be used in any of the usual forms, especially as ointments which may contain e.g. from 1 to 5% fusafungine. Nasal instillations, vaginal suppositories and the like may also be used.

Clinicology

The use of the novel anti-inflammatory composition is found to be of especial value in the treatment of various inflammatory conditions by local application, and especially in connection with dermo-hypodermic, peri-articular inflammations, hemorroidal thrombosis, and veinitis. Its application is also successful with blows, sprains, adenitis, lymphangitis. Especially satisfactory results have been obtained in the treatment of ear-nose-throat disorders, including rhinopharyngitis, angina, external otitis, etc., and gynecological diseases such as leucorrhea, vaginitis, etc.

In dermatology, the compound has been used as an oinment containing 2% of active ingredient. The skin sensitivation was first determined by applying the ointment for 48 and 96 hours on a healthy and a diseased skin (patch tests). Neither resulting sensitivity nor allergy was observed. The therapeutic activity was found to be especially satisfactory in the treatment of atomic wounds, varicose ulcers and hemorroids. When two or three daily applications of ointment were made, it has been observed a very rapid attenuation followed by disappearance of inflammation, redness and oedema. Good healing activity is also noted. Thus, out of 26 cases of varicose ulcer where other therapies had failed, rapid

| Dose fusafungine used (mg./kg.) | Number of rats | Volume increase | $\sigma$ | Inhibition, percent | $t$ | $p$ |
|---|---|---|---|---|---|---|
| 0 (control) | 10 | 311 | 5 | | | |
| 50 (intra-p) | 10 | 226 | 18 | 27 | 4.3 | <0.01 |
| 0 (control) | 10 | 318 | 5 | | | |
| 100 (intra-p) | 10 | 177 | 12 | 43 | 14 | <0.01 |
| 0 (control) | 10 | 318 | 8 | | | |
| 100 (per os) | 10 | 237 | 14 | 25 | 3.56 | <0.01 |
| Acetylsalicyl acid, 500 mg./kg. per os | 10 | 240 | 34 | 35 | 4.5 | <0.01 |
| Controls | 10 | 373 | 21 | | | | cures were obtained in 20 cases by application of the compound of the invention. Out of nine cases of atomic wounds, quick healing was obtained in seven cases, and a substantial improvement in one other case.

In ear-nose-throat therapy, 192 cases of rhinopharyngitis, sinusitis, acute cold, chronic otitis and operational sequels were treated by nose and ear instillation or nebulization of a solution containing 0.5% of the compound, four or five times a day. A very prompt regression of inflammatory symptoms was noted in nearly all cases. Slight vaso-constrictive activity was also noted. The drug was found to be well tolerated, there were no signs of local irritation or allergy.

In gynecology, the compound was given in the form of vaginal suppositories containing 50 mg. active compound, in some cases combined with ointment. Very good results were noted in respect to vulvo-vaginitis and vulvary pruritis.

The following clinical case is described as one example.

A female patient, age 45, had large leg varices as a consequence of repeated pregnancies. Above the inner left malleus was a purplish plaque showing hard and painful oedema with a likelihood of incipient formation of varicose ulcer. The patient was then treated one week by applying three times a day a 2% fusafungine-base topical excipient or ointment. The oedema and pain rapidly disappeared. The purple colour receded more slowly, leaving reddish stripes of cicatricial tissue.

What I claim is:

The method of treating inflamamtory conditions of non-microbial origin which comprises administering to humans topically on the diseased skin or mucous membrane a topical excipient containing 0.5 to 2% of fusafungine.

References Cited by the Examiner

FOREIGN PATENTS 1,021,824   2/1953   France.
1,164,181   10/1958   France.

JULIAN S. LEVITT, *Primary Examiner.*

SAM ROSEN, *Assistant Examiner.*